Sept. 21, 1965 M. J. BEER ETAL 3,207,995
FREQUENCY DEVIATION DETECTOR
Filed April 20, 1962
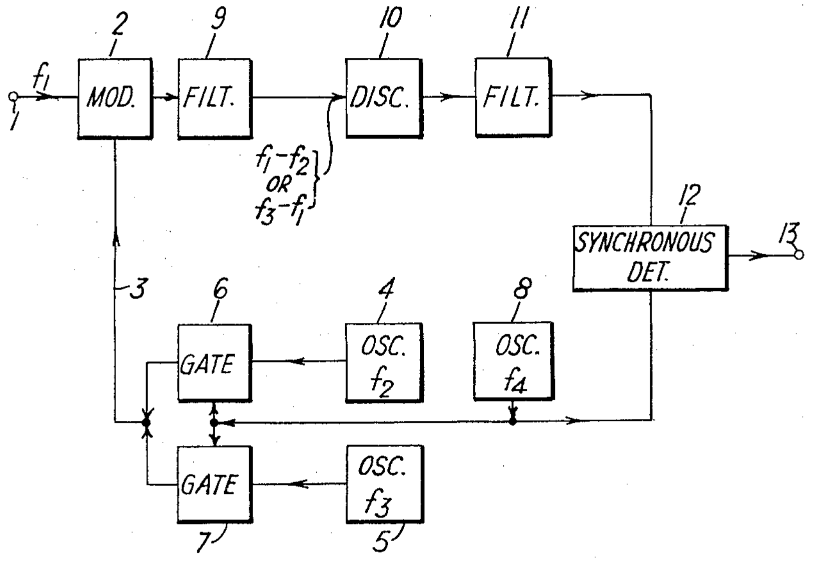
Inventors
MARCUS J. BEER
RAYMOND E. SCHEMEL
By
Attorney United States Patent Office 3,207,995

Patented Sept. 21, 1965

3,207,995

FREQUENCY DEVIATION DETECTOR

Marcus John Beer and Raymond Etienne Schemel, London, England, assignors to International Standard Electric Corporation, New York, N.Y., a corporation of Delaware Filed Apr. 20, 1962, Ser. No. 189,180
Claims priority, application Great Britain, May 11, 1961, 17,164/61
12 Claims. (Cl. 328—133)

This invention relates to frequency deviation detectors and more particularly to frequency deviation detectors for frequency modulated waves.

Automatic frequency control or indication circuits are known in which an "error signal" is derived from an input wave and a reference wave, the magnitude of the error signal being related to the magnitude of the frequency difference between the two waves.

In all automatic frequency control (AFC) circuits this error signal controls a suitable electronic or electromechanical device, such as a reactance valve or a tuning motor, to alter the frequency of a generator to oppose and correct any frequency error. This arrangement constitutes a closed loop servomechanism. Frequency deviation detectors are also used in open loop servomechanisms in which it is required to indicate but not to control a change in frequency. The essential feature in all similar applications is the means by which the error signal is derived. Such means include frequency discriminator circuits of various kinds.

The use of frequency discriminators in circuits using frequency modulated waves presents certain difficulties which arise because in addition to the, usually slow, drifts of the center frequency which it is desired to control the discriminator is subjected to the deviation of the frequency due to modulation. For this reason, it is essential that the useful range of the discriminator characteristic should be symmetrical about its operating point. It is apparent that if it is not, i.e., the characteristic contains even order nonlinear terms, the discriminator will produce an output signal which will vary with the deviation of the input signal even if the center frequency remains constant. A spurious signal which is indistinguishable from that caused by a change of center frequency is thus generated. That spurious signal increases rapidly with an increase of deviation of an input signal and sets a limit to the accuracy of operation of frequency discriminators.

It is an object of the present invention to provide an improved frequency deviation detector to reduce the errors caused by even order nonlinear terms of the discriminator characteristic.

A feature of this invention is the provision of a frequency deviation detector comprising means for predeterminedly amplitude modulating a frequency modulated input signal, a frequency discriminator coupled to the amplitude modulating means providing a composite output signal containing a wanted component which is periodically frequency inverted and unwanted components which are not so inverted, and means for selecting from the composite output signal the wanted component.

The above-mentioned and other features and objects of this invention and the manner of obtaining them will become more apparent by reference to the following description taken in conjunction with the drawing, the single figure of which illustrates in schematic block diagram form one embodiment of a frequency deviation detector according to the principles of the invention.

The frequency modulated signal, the actual center frequency, $f_1$, of which is to be controlled or monitored, is applied to modulator 2 via input terminal 1. The modulator is also supplied with a carrier frequency over lead 3. Two stable oscillators 4 and 5, preferably crystal controlled, generate frequencies $f_2$ and $f_3$, respectively, and are alternately connected to lead 3 through gates 6 and 7 arranged so that when one gate is open the other is closed and vice versa. These gates are operated by auxiliary oscillator 8 generating a frequency $f_4$. The frequencies $f_2$ and $f_3$ are chosen to be symmetrical with respect to $f_0$, which is the nominal value of $f_1$, i.e., the mean value of $f_2$ and $f_3$ being equal to $f_0$. The lower sideband $f_1-f_2$ or $f_3-f_1$ is passed by filter 9 and is applied to discriminator 10. Discriminator 10 is centered on the frequency $f_0-f_2=f_3-f_0$. After filtering in filter 11, and if necessary after amplification (not shown), the discriminator output is applied to synchronous detector 12 together with a signal from oscillator 8. Synchronous detector 12 is a conventional phase sensitive detector giving an electrical output signal over terminal 13. In an alternative arrangement synchronous detector 12 could be a two phase electric actuator or motor in which case 13 represents an output armature or shaft. The electrical or mechanical output obtained at 13 constitutes the "error signal," the magnitude and sense of which are functions of the magnitude and direction of the difference between the actual center frequency $f_1$ and its nominal value $f_0$. This error signal is used in known ways for AFC, indication or other purposes. It will be understood that oscillators 4 and 5 and gates 6 and 7 can be replaced by a single oscillator the frequency of which can be periodically altered from $f_2$ to $f_3$ by a control signal.

The method of operation is as follows:

When the center frequency of the input signal is at its nominal value $f_0$, the input to discriminator 10 is a constant frequency $f_0-f_2=f_3-f_0$. There is, therefore, no variation in discriminator output and, hence, no output from synchronous detector 12.

If for any reason the center frequency, $f_1$ of the input signal drifts by an amount $\Delta f$ from its nominal value $f_0$, the discriminator input will have a frequency $f_1-f_2$ when gate 6 is open and a frequency $f_3-f_1$ when the gate 7 is open. The output signal of discriminator 10 will, therefore, be a square wave having a frequency $f_4$, the frequency of auxiliary oscillator 8. The amplitude of the square wave will be substantially proportional to $\Delta f$, the phase of the square wave reversing when the sign of $\Delta f$ changes. This output signal will also contain spurious components caused by even order terms of the discriminator characteristic. These terms will contain a direct current component and harmonics of the modulating frequency.

The output signal of discriminator 10 is applied to synchronous detector 12 in which only components having a frequency $f_4$ will cause a direct current output. Spurious signals of frequency other than $f_4$ will, therefore, either give an A.C. (alternating current) output signal or, if suppressed by a filter, will not be present at all.

From the above description, it is apparent that the basic idea of the invention is to provide a means to predeterminedly amplitude modulate the frequency modulated input signal (modulator 2, gates 6 and 7, oscillators 4, 5, and 8) in such a way before applying it to the discriminator that the wanted and spurious components in the discriminator output can be distinguished and separated from each other by a means to select (synchronous detector 12). In the perferred embodiment, the method of predetermined amplitude modulation used results in periodic frequency inversion of the wanted signal by the use of two switched carrier oscillators. By frequency inversion is meant any method by which a frequency change in an input signal is translated into a frequency change of opposite sign in an output signal. Other methods of achieving the same result are possible.

It is desirable that the time intervals during which each of oscillators 4 and 5 are connected to modulator 2 should be equal. This implies that the waveform of auxiliary oscillator 8 should be symmetrical. If it is not, higher order spurious signals will be introduced in the discriminator output. The effect of these additional spurious signals can, however, be minimized by arranging filter 11 to prevent them from reaching synchronous detector 12.

The amplitude of the wanted signal in the output signal (composite signal) of discriminator 10 is dependent not only on the frequency of the input signal, but also on its amplitude. For this reason, the output circuit of modulator 2 should be provided with amplitude limiting means.

By their very nature AFC devices tend to oppose and reduce any change in frequency of an input signal. In such application, it is, therefore, usual to arrange for the time constant of the control loop to exceed the period of the lowest modulation frequency.

While we have described above the principles of our invention in connection with specific apparatus, it is to be clearly understood that this description is made only by way of example and not as a limitation to the scope of our invention as set forth in the objects thereof and in the accompanying claims.

We claim:

1. A frequency deviation detector comprising:
- means for predeterminedly amplitude modulating a frequency modulated input signal;
- a frequency discriminator coupled to said modulating means providing a composite signal containing a wanted component which is periodically frequency inverted and unwanted components which are not so inverted; and
- means to select from said composite signal said wanted component.

2. A detector according to claim 1, wherein said modulating means includes:
- an amplitude modulator; and
- a means to couple two carrier waves alternately to said modulator.

3. A detector according to claim 2, wherein the frequency of each of said waves are selected so that their mean value is equal to a predetermined center frequency of said input signal.

4. A detector according to claim 2, wherein said means to couple includes:
- an auxiliary signal source to control the coupling of said carrier waves to said modulator.

5. A detector according to claim 4, wherein said wanted component is a wave having the frequency of the auxiliary signal.

6. A detector according to claim 5, wherein said means to select includes:
- a synchronous detector to compare said composite signal and said auxiliary signal.

7. A detector according to claim 1, wherein said modulating means includes:
- an amplitude modulator;
- a first source of carrier wave having a given frequency;
- a second source of carrier wave having a frequency predeterminedly spaced from said given frequency;
- gating circuits coupling to said first and second sources and in common to said amplitude modulator; and
- a third source of carrier wave having a frequency different than the frequencies of the carrier waves of said first and second sources coupled in common to said gate circuits to control said gate circuits for alternate conduction thereof.

8. A detector according to claim 7, wherein said means to select includes:
- a synchronous detector coupled to said discriminator and said third source.

9. A frequency deviation detector comprising:
- a frequency discriminator;
- means coupled to the input of said discriminator for amplitude modulating a frequency modulated input signal to produce at the output of said discriminator a composite signal containing a wanted component which is periodically frequency inverted and unwanted components which are not so inverted; and
- means coupled to said discriminator and said modulating means to select from said composite signal said wanted component.

10. A frequency deviation detector comprising:
- means for predeterminedly amplitude modulating a frequency modulated input signal;
- means coupled to the output of said modulating means to pass a given one of the sidebands of the amplitude modulated output of said modulating means;
- a frequency discriminator coupled to said last mentioned means providing a composite signal containing a wanted component which is periodically frequency inverted and unwanted components which are not so inverted; and
- means to select from said composite signal said wanted component.

11. A frequency deviation detector comprising:
- means for predeterminedly amplitude modulating a frequency modulated input signal;
- means coupled to the output of said modulating means to pass the lower sideband of the amplitude modulated output of said modulating means;
- a frequency discriminator coupled to said last mentioned means providing a composite signal containing a wanted component which is periodically frequency inverted and unwanted components which are not so inverted; and
- means to select from said composite signal said wanted component.

12. A frequency deviation detector comprising:
- means for predeterminedly amplitude modulating a frequency modulated input signal;
- a frequency discriminator coupled to said modulating means providing a composite signal containing a wanted component which is periodically frequency inverted generated by said modulation means and unwanted components which are not so inverted generated by said discriminator characteristics; and
- means to select from said composite signal said wanted component.

References Cited by the Examiner

UNITED STATES PATENTS

| | | | |
|---|---|---|---|
| 2,584,608 | 2/52 | Norton | 332—19 X |
| 2,896,074 | 7/59 | Newsom et al. | 328—138 X |

GEORGE N. WESTBY, *Primary Examiner.*

DAVID J. GALVIN, *Examiner.*